(12) United States Patent
Patel et al.

(10) Patent No.: US 7,930,394 B2
(45) Date of Patent: Apr. 19, 2011

(54) MEASURED CLIENT EXPERIENCE FOR COMPUTER NETWORK

(75) Inventors: Parveen Patel, Redmond, WA (US); Albert Gordon Greenberg, Seattle, WA (US); David Maltz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 202 days.

(21) Appl. No.: 12/243,848

(22) Filed: Oct. 1, 2008

(65) Prior Publication Data

US 2010/0082804 A1    Apr. 1, 2010

(51) Int. Cl.
 *G06F 15/16* (2006.01)
 *G06F 15/173* (2006.01)
 *G06F 15/177* (2006.01)

(52) U.S. Cl. ........ 709/224; 709/238; 717/116; 370/252; 370/225

(58) Field of Classification Search .......... 709/217–228, 709/203–206, 238; 717/116; 370/252, 225
See application file for complete search history.

(56) References Cited

U.S. PATENT DOCUMENTS

| | | | |
|---|---|---|---|
| 6,021,439 A | | 2/2000 | Turek et al. |
| 6,625,647 B1 | | 9/2003 | Barrick et al. |
| 7,069,177 B2 | | 6/2006 | Carley |
| 7,353,272 B2 | | 4/2008 | Robertson et al. |
| 7,379,427 B2 | | 5/2008 | Boss et al. |
| 2006/0235961 A1 | | 10/2006 | Klein et al. |
| 2007/0242616 A1 | | 10/2007 | Chang et al. |
| 2008/0052509 A1* | 2/2008 | Ahmed ............... 713/156 |
| 2008/0263566 A1* | 10/2008 | Buerge et al. ............... 719/317 |
| 2009/0006531 A1* | 1/2009 | Gillum et al. ............... 709/203 |
| 2009/0125634 A1* | 5/2009 | Virdi et al. ............... 709/231 |
| 2009/0172167 A1* | 7/2009 | Drai et al. ............... 709/226 |
| 2009/0178087 A1* | 7/2009 | Menn et al. ............... 725/86 |
| 2009/0182815 A1* | 7/2009 | Czechowski et al. ......... 709/206 |
| 2009/0274043 A1* | 11/2009 | Guo et al. ............... 370/225 |
| 2009/0292806 A1* | 11/2009 | DePue et al. ............... 709/225 |

OTHER PUBLICATIONS

Gatek, et al., "A Web content serving utility", IBM Systems Journal, vol. 43, Issue 1, Jan. 2004, 16 pages. http://www.research.ibm.com/journal/sj/431/gayek.html.
Freedman, et al., "Oasis: Anycast for Any Service", Proceedings of the 3rd conference on Networked Systems Design & Implementation—vol. 3, 2006, 25 pages. http://www.usenix.org/event/nsdi06/tech/full_papers/freedman/freedman_html/index.html.
Cherkasova, et al., "Measuring and Characterizing End-to-End Internet Service Performance", ACM Transactions on Internet Technology, vol. 3, No. 4, Nov. 2003, pp. 347-391. John Richard Liston, "Measuring User-Perceived Internet Performance in Multiple Locations", Jul. 2004, 75 pages.
Zhan Xiaoying, "Application of Overlay Techniques to Network Monitoring", PhD thesis, University of Glasgow, May 2008, 202 pages.

* cited by examiner

*Primary Examiner* — Haresh N Patel
(74) *Attorney, Agent, or Firm* — Alleman Hall McCoy Russell & Tuttle LLP

(57) ABSTRACT

Routing network traffic on a computer network is described. In one embodiment, a method is presented which includes transmitting instructions to a client, the instructions executable by the client to request content from two or more content servers, measure two or more network performance characteristics associated with the two or more different content servers, and issue a report to an administrative server. The report may include a first network performance characteristic and a second network performance characteristic. The method may further include selecting a target content server from one of two or more content servers based on comparison of the two or more network performance characteristics; and transmitting routing instructions to an intermediate routing system, the routing instructions executable by the intermediate ate routing system to direct subsequent content requests transmitted by the client to the target content server.

14 Claims, 4 Drawing Sheets

MEASURED CLIENT EXPERIENCE FOR COMPUTER NETWORK

BACKGROUND

Some Internet content providers and Internet service providers serve the same content or provide the same services from multiple data centers. These data centers may reside at geographically diverse locations. A user that interacts with the network via a client device may be directed to one of the multiple data centers when requesting content or services from the network.

SUMMARY

A client is directed to a select target content server of multiple content servers based on a network performance characteristic measured from a client interaction with two or more content servers. In one embodiment, instructions are transmitted to the client where the instructions are executable by the client to request content from two or more content servers via an intermediate routing system. The instructions may be further executable by the client to issue a report to an administrative server, where the report includes a first network performance characteristic associated with the client's interaction with a first content server and a second network performance characteristic associated with the client's interaction with a second content server.

Based on the network performance characteristics measured for each content request, at least one target content server may be selected from the two or more content servers. Routing instructions may be transmitted to one or more of the intermediate routing system, the client, or the content servers that are executable to direct subsequent content requests of the client to the target content server. Other clients of the network that exhibit a pre-determined relationship to the client from which the network performance characteristics were measured may also be directed to the target content server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
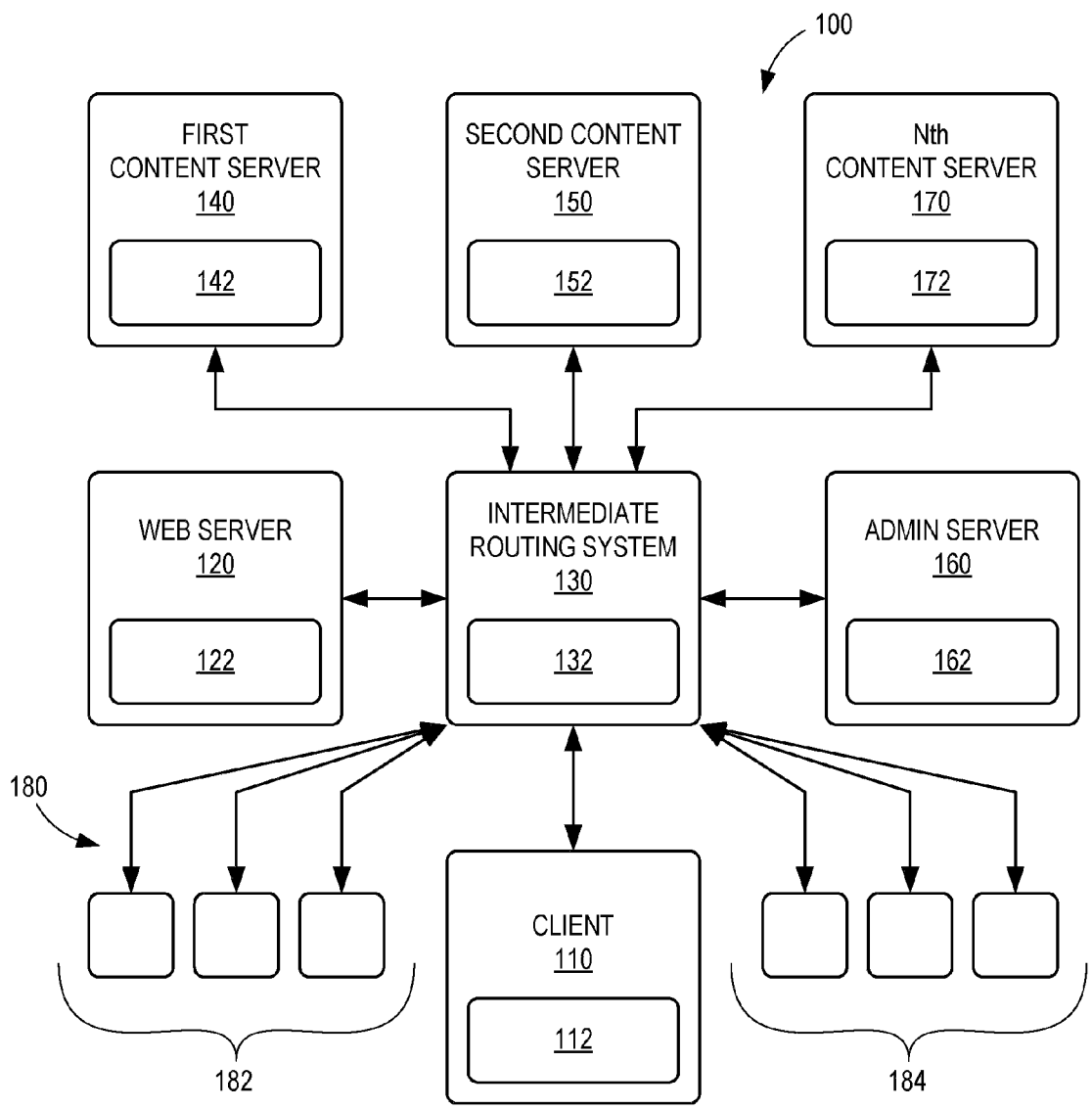
FIG. 1 illustrates an example embodiment of a computer network.

As described herein, an indication of user experience with respect to multiple interactions with a computer network may be measured by initiating multiple content requests to different content servers. Based on measured network characteristics (performance, reliability, etc.) obtained from two or more content servers, a target content server may be selected that provides a suitable user experience. A measured network characteristic may provide an indication of one or more of the following: a speed of a particular network interaction, a responsiveness of a particular component (e.g., content server) of the computer network, a reliability of a particular network interaction, and/or a reliability of a particular component of the computer network. The workload of a particular network component such as a content server may be affected by a variety of factors that impact a user's overall experience when using that content server (e.g., speed and/or reliability of service). For example, a first set of factors affecting workload of a particular content server may relate to how busy the content server is, which may be a function of an amount of traffic (e.g., number of content requests) that are being processed by the content server, a capacity of the content server to process these content requests, and a processing characteristic of the content requests received by the content server. For example, some content requests may utilize greater processing resources of the content server than other content requests.

A second set of factors affecting the workload of a particular content server may relate to the network conditions that exist between the client and the content server, including data loss and network latency. As such, a measure of an amount of time for the content server to respond to a particular content request may provide an indication of the workload of the content server. A third set of factors affecting workload of a particular content server may relate to a type of content that is requested by the content request transmitted from the client. Some types of content may reside only at a specific subset of the total population of content servers that are accessible by the client. For example, email content of the client may reside at only a single content server or a limited number of content servers.

In some embodiments, a content server or content servers that consistently provide the fastest response to the client's content requests (e.g., download time) may be selected as the target content server for fulfilling subsequent content requests. The term "content" as used herein may refer to static information as well as web services that include dynamic information or perform actions such as scheduling a plane flight, storing data, etc. It should also be understood that a content server may be a single server machine, a front end to a group of server machines (e.g., a load balancer), or a collection of server machines (e.g., a data center) which may reside at the same location.

FIG. 1 illustrates an example embodiment of a computer network 100. Computer network 100 may refer to one or more of a local area network and a wide area network (e.g., the Internet). Computer network 100 may include a plurality of network elements, including one or more of: a client 110, a web server 120, an administrative server 160, and one or more content servers that may communicate via an intermediate routing system 130.

In the example embodiment of FIG. 1, a first content server 150 and a second content server 160 may communicate with other network elements of computer network 100 via intermediate routing system 130. In some embodiments, first content server 150 is located geographically remote from the second content server 160. It should be appreciated that computer network 100 may include any suitable number of content servers as depicted by Nth content server 170.

Client 110 may refer to a computing device such as a personal computer, media device, video game console, etc. Client 110 may be operated by a user to retrieve content from one or more network elements, including web server 120, first content server 140, and second content server 150. Client 110 may refer to a computing device that is mobile or stationary. Client 110 may communicate with other network elements of computer network 100 via wired or wireless communication.

In some embodiments, client 110 is one of a plurality of clients 180. As will be described in greater detail, measurements obtained from network experience of client 110 may be applied to a sub-set of clients 182 of the plurality of clients 180 that exhibit a pre-determined relationship to client 110. In this way, sub-set of clients 182 may be directed to the same content server as client 110. By contrast clients 184 of the plurality of clients 110 that are not part of sub-set of clients 182 may be directed to a different content server than client 110 or sub-set of clients 182.

Intermediate routing system 130 may refer to one or more routers configured to direct communications between two or more network elements of computer network 100 according to routing instructions 132. In some embodiments, intermediate routing system 130 may utilize a hierarchical naming system for computers, services, or resources participating in the network, such as the Domain Name Service (DNS). For example, the DNS may exist on DNS servers of the intermediate routing system.

Figure 2:
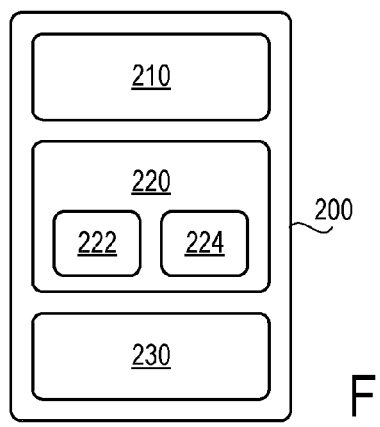
FIG. 2 illustrates an example embodiment of a network element.

FIG. 2 illustrates a non-limiting example embodiment of a network element 200. As one example, network element 200 may refer to any of the previously described network elements of FIG. 1, including client 110, web server 120, administrative server 160, intermediate routing system 130, first content server 150, second content server 160, Nth content server 170, one or more of plurality of clients 180.

In the example embodiment of FIG. 2, network element 200 includes a logic subsystem 210, memory 220, and a network interface 230. It should be appreciated that network element 200 may include other suitable components. For example, network element 200 may include a graphical display which may present a graphical user interface to a user and may include a user input device for receiving user input.

Logic subsystem 210 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, change the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Memory 220 may include one or more physical devices configured to hold data and/or instructions that, when executed by the logic subsystem, cause the logic subsystem to implement the herein described methods and processes. In the example embodiment of FIG. 2, memory 220 is depicted holding instructions 222, which may be executed by logic subsystem 210. Memory 220 may also hold data at a data store 224. Memory 220 may include removable media and/or built-in devices. Memory 220 may include optical memory devices, semiconductor memory devices, and/or magnetic memory devices, among others. Memory 220 may include portions with one or more of the following characteristics: volatile, nonvolatile, dynamic, static, read/write, read-only, random access, sequential access, location addressable, file addressable, and content addressable. In some embodiments, logic subsystem 210 and memory 220 may be integrated into one or more common devices and/or computing systems.

Network element 200 may communicate with other network elements via network interface 230. For example, network element 200 may transmit data via network interface 230 and may receive data from other network elements via network interface 230 as will be described in greater detail by the process flows of FIGS. 3-5.

Referring also to FIG. 1, where network element 200 refers to web server 120, data store 224 of memory 220 may include instructions 122 that may be transmitted to client 110. In some embodiments, instructions 122 include one or more of a webpage and an agent. Where network element 200 refers to client 110, instructions 222 held by memory 220 may include a web browser 112 that is configured to execute webpages at client 110. Where network element 200 refers to one or more of first content server 140, second content server 150, and Nth content server 170, data store 224 of memory 220 may respectively include content 142, content 152, or content 172, which may be transmitted to client 110 responsive to a content request. Content 142, content 152, and content 172 may alternatively or additionally refer to dynamic information or web services that may be provided by or performed at the content servers on behalf of the client.

Where network element 200 refers to intermediate routing system 130, instructions 222 of memory 220 may include routing instructions 132 that direct content requests transmitted by client 110 to one or more of the other network elements. Where network element 200 refers to administrative server 160, instructions 222 of memory 220 may include a networking mapping module 162. As will be described in greater detail be the process flow of FIG. 3, network mapping module 162 may utilize measurements of network performance characteristics obtained from one or more of client 110, first content server 140, second content server 150, and Nth content server 170 to transmit routing instructions to intermediate routing system 130.

Figure 3:
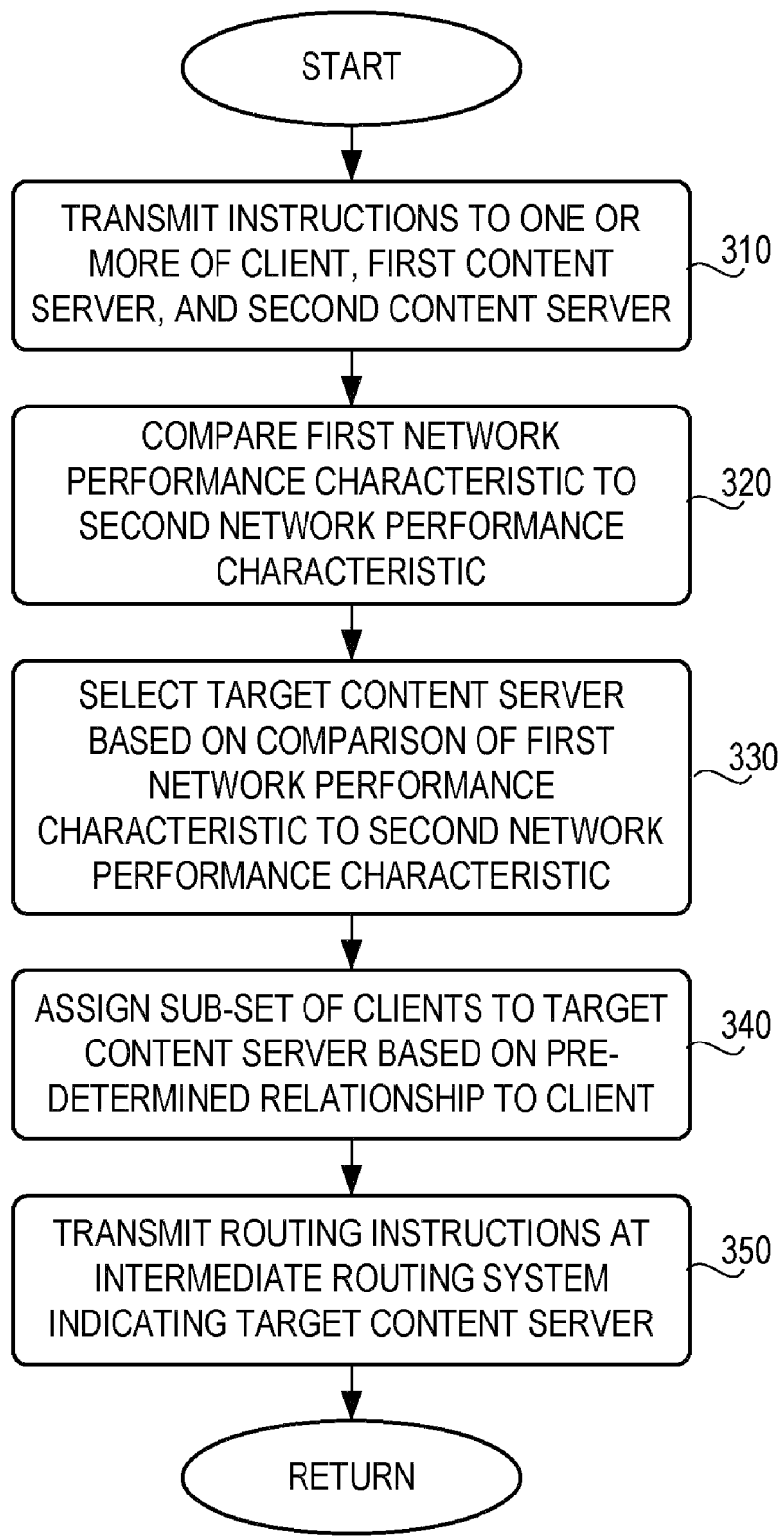
FIGS. 3-5 illustrate example process flows depicting a method of operating a computer network.
Figure 4:
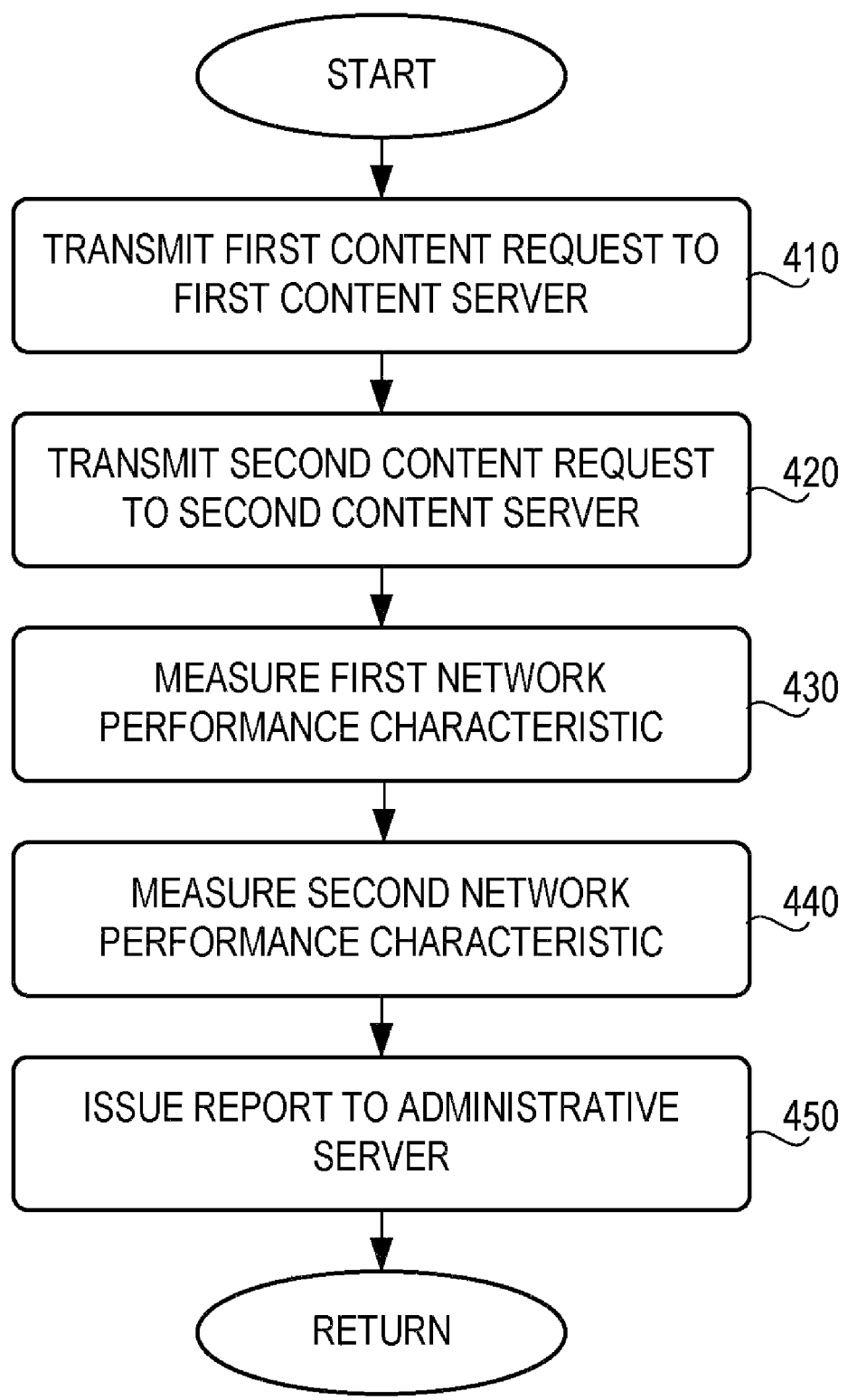
Figure 5:
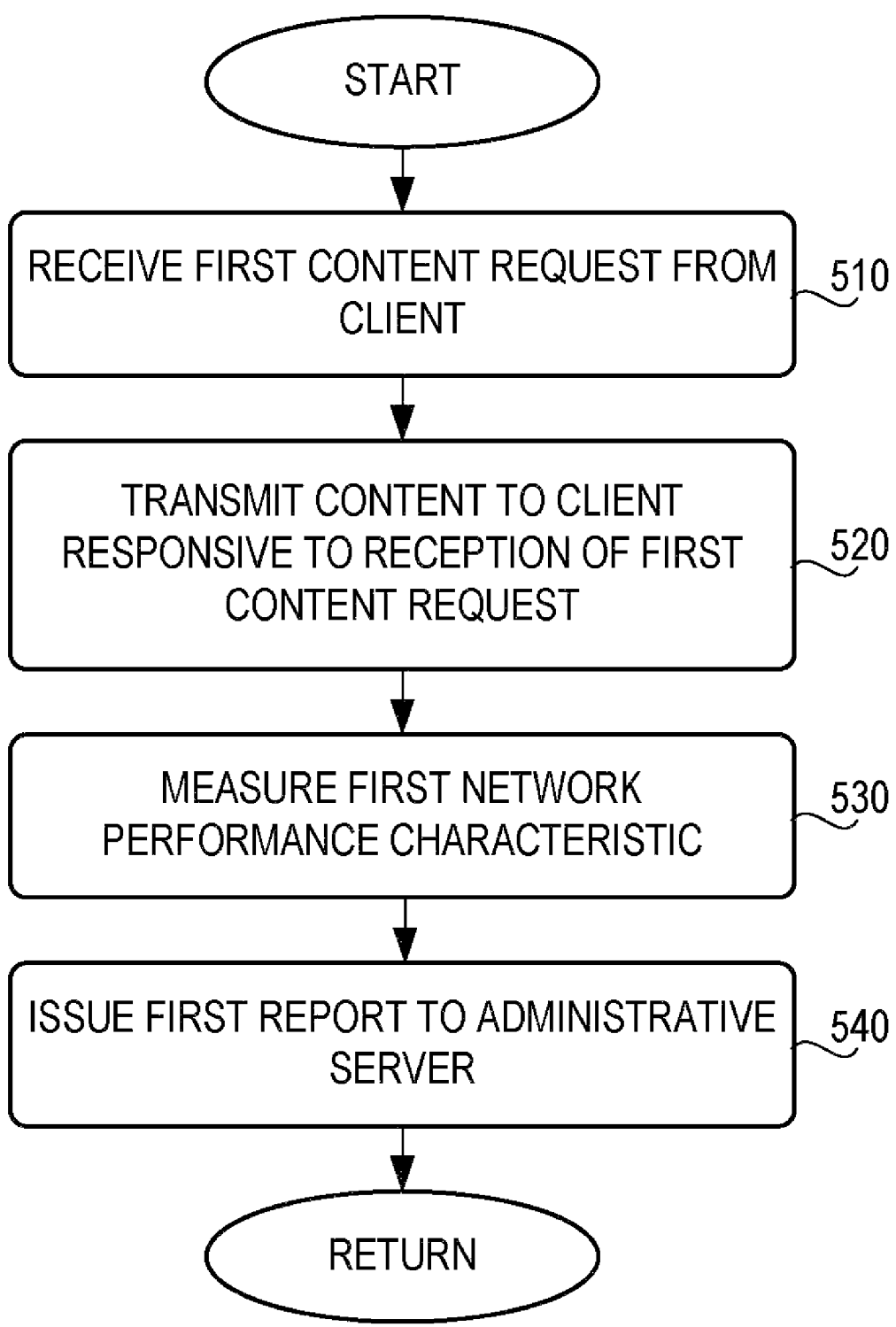

FIGS. 3-5 illustrate process flows depicting a method of routing network traffic on a computer network. While these process flows depict various processes from a perspective of a particular network element, it should be appreciated that these processes may be performed by any suitable network element or group of network elements. In the following examples, FIG. 3 illustrates a process flow from the perspective of administrative server 160, FIG. 4 illustrates a process flow from the perspective of client 110, and FIG. 5 illustrates a process flow from the perspective of first content server 150 or second content server 160.

Referring to FIG. 3, the method includes, at 310, transmitting instructions (e.g., instructions 122) to one or more of a client, a first content server, and a second content server. In some embodiments, the instructions transmitted to the client may include a first reference indicating a first content server and a second reference indicating a second content server. The instructions transmitted at 310 may be executable by the client to perform one or more of the processes of FIG. 4. For example, referring also to FIG. 4, at 410 the client may transmit a first content request to the first content server indicated by the first reference via an intermediate routing system, such as intermediate routing system 130. At 420, the client may transmit a second content request to a second content server via the intermediate routing system.

In some embodiments, the first reference may further indicate content to be returned to the client by the first content server and the second reference may further indicate content to be returned to the client by the second content server. It should be appreciated that web server 120 may be one of the first content server or the second content server in some embodiments. As such, the first reference or the second reference may indicate content that is to be returned to the client by the web server.

In some embodiments, the content requested by the client from the first content server, as indicated by the first reference, may include content that is unique to or identifies the client. For example, the content requested by the client may be one of a variety of different content residing at first content server 140. In this way, the client may be identified from a plurality of clients by reception of the content request at the first content server that indicates content that is unique to or identifies the client. Similarly, the content to be returned to the client by the second content server, as indicated by the second reference, may include content that is unique to or identifies the client. In some embodiments, the content indicated by the first reference and the content indicated by the second reference may be identical or may be of the same file size.

In some embodiments, transmitting the instructions to the client may include transmitting a webpage to the client, where the webpage is executable by a web browser operating at the client to perform one or more of the processes of FIG. 4. For example, a webpage transmitted to the client at 310 may be executable by the client at 410 to transmit a first content request to a first content server via the intermediate routing system and transmit a second content request to a second content server via the intermediate routing system. Where the instructions transmitted to the client include a webpage, the first reference and the second reference may refer to embedded content tags that are executable by the web browser operating at the client to request content indicated by the embedded content tags.

In some embodiments, the instructions transmitted to the client include an agent executable by the client to perform one or more of the processes of FIG. 4. As a non-limiting example, the agent may include javascript. In some embodiments, transmitting the agent to the client includes transmitting a webpage to the client, where the webpage includes the agent and may further include rendered information. The rendered information may be executable by a web browser operating at the client (e.g., web browser 112) to present the rendered information at the client via a graphical user interface of the web browser. As such, the instructions transmitted to the client may include a first portion that is executable by the client to perform processes that are perceived by a user of the client (e.g., present rendered information) and a second portion that is executable by the client to perform processes that are not perceived by the client (e.g., the processes of FIG. 4). In this way, measurement of network performance characteristics may be performed without impacting user experience.

In some embodiments, transmitting the instructions (e.g., a webpage) to the client includes transmitting the instructions to the client via a third party web server, such as web server 120. For example, administrative server 160 may transmit a webpage (e.g., instructions 122) to web server 120 where the webpage may be retrieved at web server 120 by client 110. As a non-limiting example, client 110 may initiate transmission of the instructions at 310 by transmitting a webpage request to web server 120 or administrative server 160.

Referring also to FIG. 5, in some embodiments, the first content request may be used as input by the first content server to transmit content (e.g., content 142) to the client as depicted at 510 and 520. As a non-limiting example, the first content request may include an HTTP request and the content transmitted by the first content server to the client may include an HTTP response. However, other suitable protocols may be used to provide a request and response interaction between the client and the first content server.

It should be appreciated that processes 510 and 520 of FIG. 5 may be similarly applied to the second content server, where the second content request may be used as input by the second content server to transmit content (e.g., content 152) to the client. As such, the second content request may include an HTTP request and the content transmitted by the second content server to the client may include an HTTP response.

In some embodiments, the content transmitted to the client from one or more content servers may include content that is not rendered at the client. For example, the content transmitted to the client may include a one pixel by one pixel transparent image. In some embodiments, the content transmitted to the client may include content that is rendered at the client, such as content that is presented to a user of the client via a graphical user interface. In other embodiments, operation 520 may be omitted, where content may not be transmitted to the client in response to reception of the content request.

Where computer network 100 includes at least a third content server (e.g., Nth content server 170), the instructions transmitted to the client at 310 may be executable by the client to issue a third content request to the third content server, whereby the third content request may be used as input by the third content server to transmit content (e.g., content 172) to the client. As such, it should be appreciated that any suitable number of content requests may be transmitted by the client to any suitable number of content servers. In some embodiments, the third content server is geographically remote from the first content server and the second content server.

Referring again to FIG. 4, in some embodiments, as indicated at 430, the client may measure a first network performance characteristic indicating a first period of time from transmission of the first content request to reception at the client of the content transmitted by the first content server. In other words, the first period of time may correspond to a first round trip time, including: time between transmission of the first content request and reception of the first content request at the first content server, processing time of the first content request at the first content server, and time between transmission of the content by the first content server and reception of the content transmitted by the first content server at the client. The first period of time of the first performance characteristic may indicate a workload of the first content server.

Where the requested content includes a requested web service to be provided by or performed at the content server, the transmission of the content by the first content server may include a product of the web service that was generated by the first content server or a notification that the web service requested by the client has been provided by or performed at the first content server.

At 440, the client may measure a second network performance characteristic indicating a second period of time from transmission of the second content request to reception at the client of the content transmitted by the second content server. In this way, the second period of time may correspond to a second round trip time, including: time between transmission of the second content request and reception of the second content request at the second content server, processing time of the second content request at the second content server, and time between transmission of the content by the second content server and reception of the content transmitted by the second content server at the client. The second period of time of the second performance characteristic may indicate a workload of the second content server.

Where the requested content includes a requested web service to be provided by or performed at the content server, the transmission of the content by the second content server may include a product of the web service that was generated by the second content server or a notification that the web service requested by the client has been provided by or performed at the second content server.

It should be appreciated that the first network performance characteristic and the second network performance characteristic may include any suitable period of time that is indicative of user experience with respect to the first content server and the second content server, respectively. For example, the first period of time of the first network performance characteristic may correspond to only one of the time between transmission of the first content request and reception of the first content request at the first content server, the processing time of the first content request at the first content server, or the time between transmission of the content by the first content server and reception of the content transmitted by the first content server at the client.

In some embodiments, the first network performance characteristic may indicate a reliability of the first content server as measured in response to one or more content requests directed to the first content server by the client. Similarly, the second network performance characteristic may indicate a reliability of the second content server as measured over one or more content requests directed to the second content server by the client. Furthermore, reliability may be measured over a plurality of content requests that implicate processing and/or issuance of a plurality of responses by the content servers having different sizes and/or bandwidths. In this way, reliability may be measured on the basis of content size and/or bandwidth, and an appropriate routing strategy may be employed to direct the client to a suitable content server depending on the particular size and/or bandwidth of the content that is subsequently requested by the client.

In some embodiments, the first network performance characteristic may include one or more of an estimate of the bandwidth available between the client and the first content server, a distance between the client and the first content server, an estimated time to complete a request (e.g., the first content request) at the first content server, a packet loss rate between the client and the first content server, a jitter or latency variation between the client and the first content server, a suitability of the network path between the client and the first content server for a particular type of information exchange (e.g., information representing telephone or voice communications). These and other factors may affect the workload of the first content server, and therefore may be considered by the administrative server when selecting an appropriate target server.

Similarly, the second network performance characteristic may include one or more of an estimate of the bandwidth available between the client and the second content server, a distance between the client and the second content server, an estimated time to complete a request (e.g., the second content request) at the second content server, a packet loss rate between the client and the second content server, a jitter or latency variation between the client and the second content server, a suitability of the network path between the client and the second content server for a particular type of information exchange (e.g., information representing telephone or voice communications). These and other factors may similarly affect the workload of the second content server, and therefore may be considered by the administrative server when selecting an appropriate target server. In some embodiments, as indicated at 450, the client may issue a report to an administrative server, where the report includes one or more of the first network performance characteristic measured at 430 and the second network performance characteristic measured at 440. As will be described in greater detail, the report may be used as input by the administrative server to in turn transmit routing instructions to the intermediate routing system. The routing instructions transmitted by the administrative server may be selected based on the report. These routing instructions may be executable by the intermediate routing system to direct subsequent content requests transmitted by the client to a select one of the first content server and the second content server that is associated with a shorter period of time selected from one of the first period of time and the second period of time.

As one example, client 110 may issue a report to the administrative server by transmitting the report to administrative server 160 if the first network performance characteristic and the second network performance characteristic have been measured. In some embodiments, the instructions transmitted to the client at 310 may be executable by the client to perform multiple measurements for each content server, whereby the client may periodically issue reports to the administrative server upon completion of each measurement. For example, the instructions transmitted to the client may be executable by the client to periodically request content from at least the first content server and the second content server according to a pre-defined schedule. In some embodiments, the first network performance characteristic may be transmitted to the administrative server by a different report than the second network performance characteristic.

In some embodiments, the administrative server may alternatively or additionally transmit instructions to one or more content servers, where the instructions are executable by the content servers to measure network performance characteristics and issue reports to the administrative server. For example, referring again to FIG. 5, at 530, the first content request may be used as input by the first content server to measure a first network performance characteristic indicating a first period of time from transmission of the first content request to reception of the first content request at the first content server. As such, the first network performance characteristic measured by the first content server may correspond to part of the first network performance characteristic measured at the client.

In some embodiments, the first period of time may further include processing time of the first content request by the first content server subsequent to reception of the first content request at the first content server. In some embodiments, the first period of time may further include return time of the content transmitted by the first content server between transmission of the content by the first content server and reception of the content transmitted by the first content server at the client.

It should be appreciated that process 530 of FIG. 5 may similarly apply to the second content server, where the second content request may be used as input by the second content server to measure a second network performance characteristic indicating a second period of time from transmission of the second content request to reception of the second content request at the second content server. Similarly, the second period of time may further include processing time of the second content request by the second content server subsequent to reception of the second content request at the second content server. Further still, the second period of time may further include return time of the content transmitted by the second content server between transmission of the content by the second content server and reception of the content transmitted by the second content server at the client.

Where computer network 100 includes at least a third content server, where the a third content request may be used as input by the third content server to measure a third network performance characteristic indicating a third period of time from transmission of the third content request to reception of the third content request at the third content server. As such, it should be appreciated that any suitable number of network performance characteristics may be measured between the client and any suitable number of content servers.

Referring again to process 310 of FIG. 3, in some embodiments, the method may include transmitting instructions (e.g., a first agent) to the first content server, where the instructions are executable by the first content server to issue a first report to an administrative server at 540 of FIG. 5. In some embodiments, the first report may include the first network performance characteristic measured by the first content server at 530.

It should be appreciated that process 540 of FIG. 5 may be similarly applied to the second content server, where the method may include transmitting instructions (e.g., a second agent) to the second content server, where the instructions are executable by the second content server to issue a second report to the administrative server. The second report may include the second network performance characteristic measured by the second content server. The reports received at the administrative server may be optionally stored in memory at a data store.

As previously described, each of the first performance characteristic and the second performance characteristic may provide an indication of workload. For example, the report issued to the administrative server by one or more of the client (e.g., at 450) and the first content server (e.g., at 540) may indicated the workload of the first content server. Similarly, the report issued to the administrative server by one or more of the client and the second content server may indicate the workload of the second content server. Referring again to the process flow of FIG. 3, the method may include, at 320, comparing the first network performance characteristic to the second network performance characteristic. In some embodiments, comparing the first network performance characteristic to the second network performance characteristic is performed by the administrative server. As one example, the administrative server retrieves one or more reports from memory, including at least the first network performance characteristic and the second network performance characteristic It should be appreciated that the first network performance characteristic and the second network performance characteristic may be received from the client in accordance with the process flow of FIG. 4; or the first network performance characteristic may be received from the first content server and the second network performance characteristic may be received from the second content server in accordance with the process flow of FIG. 5. Furthermore, it should be appreciated that the process at 320 may include comparing three or more network performance characteristics indicative of a client's interaction with three or more different content servers.

In some embodiments, comparing the first network performance characteristic to the second network performance characteristic includes identifying a shorter period of time from one of the first period of time and the second period of time. In some embodiments, comparing the first network performance characteristic to the second network performance characteristic may be performed by the administrative server. For example, the administrative server may be configured to identify which of the first network performance characteristic or the second network performance characteristic exhibits a faster response to a particular action performed over the computer network, such as a response to a content request. In this way, the administrative server can identify which of the two or more content servers is experiencing a smaller relative workload at the time of the measurement.

At 330, the method may include selecting a target content server from one of the first content server and the second content server based on a comparison of the first network performance characteristic to the second network performance characteristic. For example, the administrative server may select the target content server from two or more content servers for which measurements of network performance characteristics were observed based on the comparison performed at 320.

In some embodiments, selecting the target content server includes selecting the target content server from one of the first content server and the second content server associated with the shorter period of time. For example, network mapping module 162 of administrative server 160 may select the first content server as the target content server if the first network performance characteristic associated with the first content exhibits a shorter period of time than the second network performance characteristic associated with the second content server. In this way, the administrative server may select a target content server that provides a more rapid user experience for a user at the client.

As one example, the content transmitted by the first content server (e.g., at 520) to the client may include an indication of the workload of the first content server and the content transmitted by the second content server to the client may include an indication of the workload of the second content server. The client may forward the indication of the workload of each of the first content server and the second content server to the administrative server via the report issued by the client (e.g., at 450).

As another example, the first content server may transmit an indication of a workload of the first content server to the administrative server via the report issued to the administrative server at 540. Similarly, the second content server may transmit an indication of workload of the second content server to the administrative server via the report issued to the administrative server. In some embodiments, selecting the target content server includes selecting the target content server from one of the first content server and the second content server associated with a smaller workload.

In some embodiments, selecting the target content server from one of the first content server and the second content server is further based on an amount of content requested by subsequent content requests transmitted by the client. For example, the administrative server may select the first content server as the target content server when the client subsequently requests a smaller amount of content (e.g., a smaller file size or a smaller bandwidth) and may select the second content server at the target content server when the client subsequently requests a larger amount of content (e.g., a larger file size or a larger bandwidth).

Where the client is one of a plurality of clients, at 340, the method may include assigning a sub-set of clients of the plurality of clients to the target content server based on a pre-determined relationship of the sub-set of clients. The routing instructions transmitted to the intermediate routing system may be executable by the intermediate routing system to direct content requests transmitted by the sub-set of clients to the target content server via the intermediate routing system. As one example, the pre-determined relationship includes one or more of geographic proximity of the sub-set of clients to the client, and an IP address of the sub-set of clients relative to the IP address of the client. It should be appreciated that the geographic location and/or IP address of each client of the plurality of clients may be stored in memory at administrative server 160, or may be retrieved by administrative server 160 from third party sources.

For example, the administrative server may select the sub-set of clients (e.g., sub-set of clients 182) from the plurality of clients (e.g., plurality of clients 180) by selecting from the plurality of clients only those clients which are within a pre-determined geographic radius to the client. As another example, the administrative server may select the subset of clients from the plurality of clients by selecting from the plurality of clients only those clients that share an IP address with the client or only those clients that are part of a hierarchical IP address structure that is more closely associated with the client's IP address than other clients (e.g., such as sub-set of clients 184).

Routing instructions may be transmitted to one or more of the intermediate routing system, the client, or the content servers that are executable to direct subsequent content requests of the client to the target content server. Example techniques for directing or redirecting the client content requests may include, but are not limited to, one or more of DNS changes, caching on the client, and HTTP redirects sent from a first contacted server redirecting the client to a targeted server. For example, at 350, the method may include transmitting routing instructions to the intermediate routing system, where the routing instructions are executable by intermediate routing system to direct subsequent content requests transmitted by the client to the target content server. In some embodiments, transmitting routing instructions to the intermediate routing system includes transmitting a network mapping update from the administrative server to the intermediate routing system, where the network mapping update indicates the target content server.

As a non-limiting example, a hierarchical naming system for computers, services, or resources participating in the network, such as the Domain Name Service (DNS) may be part of the intermediate routing system. For example, the DNS may exist on DNS servers of the intermediate routing system. As part of their normal activity, clients may contact the DNS (e.g., DNS servers of the intermediate routing system) to convert a name (e.g., a URL) by which the clients know or recognize the content or service they wish to access (e.g., search.live.com) into an IP (Internet protocol) address identifying a server or servers (e.g., one or more content servers) that should answer the request.

The routing instructions transmitted to the intermediate routing system may be executable by the DNS servers to convert names of services (e.g., search.live.com) into one or more IP addresses. The routing instructions may, for example, tell the DNS to provide different answers to different clients, depending on features of the client, such as client's IP address or an IP address of a local resolver acting on the client's behalf. In some embodiments, the routing instructions transmitted to the intermediate routing system may include the DNS.

In an alternate embodiment, the intermediate routing system may direct clients to one or more data centers of its choice. The administrative server may transmit the routing instructions to network elements or computers at these data centers. The data centers that receive requests from clients that the routing instructions indicate would be best served by another data center may issue an HTTP redirect command to the client, the HTTP redirect command may be executable by the client to resend its content request to the selected data center without requiring further action on the part of the client user.

In some embodiments, the routing instructions transmitted to the intermediate routing system may indicate two or more target content servers. For example, where the administrative server judges that the first content server is the target server when the client subsequently requests a smaller amount of content and the second content server is the target server when the client subsequently requests a larger amount of content, the routing instructions transmitted to the intermediate routing system are executable by the intermediate routing system to direct the client's subsequent content request to an appropriate one of the first content server and the second content server depending on the size of the content requested by the client.

In some embodiments, the routing instructions transmitted to the intermediate routing system may indicate the sub-set of clients assigned to the target content server based on the pre-determined relationship of the sub-set of clients to the client. These routing instructions may be executable by the intermediate routing system to direct content requests transmitted by the sub-set of clients to the target content server via the intermediate routing system. In this way, measurements of two or more network performance characteristics that are obtained by activity of a first client may influence routing instructions associated with activity of a second client with the computer network. Clients of the plurality of clients that are not members of the sub-set of clients may be assigned to other content servers according to measurements of network performance characteristics obtained from one or more other clients. As such, the routing instructions transmitted to the intermediate routing system may indicate different target content servers associated with one or more clients excluded from the sub-set of clients.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of routing network traffic on a computer network, comprising:
transmitting instructions to a client, the instructions executable by the client to:
transmit a first content request to a first content server via an intermediate routing system, the first content request causing the first content server to transmit content to the client responsive to reception of the first content request at the first content server;
transmit a second content request to a second content server via the intermediate routing system, the second content request causing the second content server to transmit content to the client responsive to reception of the second content request at the second content server;
measure a first network performance characteristic indicating a first period of time from transmission of the first content request to reception at the client of the content transmitted by the first content server;
measure a second network performance characteristic indicating a second period of time from transmission of the second content request to reception at the client of the content transmitted by the second content server; and issue a report to an administrative server, the report including the first network performance characteristic and the second network performance characteristic;

comparing the first network performance characteristic to the second network performance characteristic, wherein comparing the first network performance characteristic to the second network performance characteristic includes identifying a shorter period of time from one of the first period of time and the second period of time;

selecting a target content server from one of the first content server and the second content server based on comparison of the first network performance characteristic to the second network performance characteristic, wherein selecting the target content server includes selecting the target content server from one of the first content server and the second content server associated with the shorter period of time; and transmitting routing instructions to the intermediate routing system, the routing instructions being executable by the intermediate routing system to direct subsequent content requests transmitted by the client to the target content server.

2. The method of claim 1, wherein transmitting the instructions to the client includes transmitting a webpage to the client, the webpage including rendered information, the rendered information executable by a web browser operating at the client to present the rendered information via a graphical user interface of the client.

3. The method of claim 2, wherein transmitting the webpage to the client includes transmitting the webpage to the client via a third party web server.

4. The method of claim 1, wherein selecting the target content server from one of the first content server and the second content server is further based on a workload of each of the first content server and the second content server.

5. The method of claim 1, wherein selecting the target content server from one of the first content server and the second content server is further based on an amount of content requested by the subsequent content requests transmitted by the client.

6. The method of claim 1, wherein the first content server is located geographically remote from the second content server.

7. The method of claim 1, wherein the client is one of a plurality of clients; and wherein the method further comprises, assigning a sub-set of clients of the plurality of clients to the target content server based on a pre-determined relationship of the sub-set of clients to the client; and wherein the routing instructions are executable by the intermediate routing system to direct content requests transmitted by the sub-set of clients to the target content server.

8. A method of routing network traffic on a computer network, comprising:

transmitting instructions to a client, the instructions including a first reference indicating a first content server and a second reference indicating a second content server, the instructions executable by the client to:

transmit a first content request to the first content server indicated by the first reference via an intermediate routing system, the first content request being usable as input by the first content server to measure a first network performance characteristic indicating a first period of time, the first period of time including time from transmission of the first content request to reception of the first content request at the first content server, processing time of the first content request by the first content server subsequent to reception of the first content request at the first content server, and return time of content transmitted by the first content server between transmission of the content by the first content server and reception of the content transmitted by the first content server at the client, wherein the first content request is further usable as input by the first content server to transmit the content to the client; and transmit a second content request to the second content server indicated by the first reference via the intermediate routing system, the second content request being usable as input by the second content server to measure a second network performance characteristic indicating a second period of time, the second period of time including time from transmission of the second content request to reception of the second content request at the second content server, processing time of the second content request by the second content server subsequent to reception of the second content request at the second content server, and return time of content transmitted by the second content server between transmission of the content by the second content server and reception of the content transmitted by the second content server at the client, wherein the second content request is further usable as input by the second content server to transmit the content to the client;

comparing the first network performance characteristic to the second network performance characteristic;

selecting a target content server from one of the first content server and the second content server based on comparison of the first network performance characteristic to the second network performance characteristic; and transmitting routing instructions to the intermediate routing system, the routing instructions executable by the intermediate routing system to direct subsequent content requests transmitted by the client to the target content server.

9. The method of claim 8, wherein transmitting the instructions to the client includes transmitting a webpage to the client, wherein the webpage is executable by a web browser operating at the client.

10. The method of claim 8, wherein comparing the first network performance characteristic to the second network performance characteristic includes identifying a shorter period of time from one of the first period of time and the second period of time; and wherein selecting the target content server includes selecting from one of the first content server and the second content server associated with the shorter period of time.

11. The method of claim 8, further comprising:

transmitting a first agent to the first content server, the first agent executable by the first content server to issue a first report to an administrative server, the first report including the first network performance characteristic;

transmitting a second agent to the second content server, the second agent executable by the second content server to issue a second report to the administrative server, the second report including the second network performance characteristic.

12. The method of claim 8, wherein the client is one of a plurality of clients; and
  wherein the method further comprises, assigning a sub-set of clients of the plurality of clients to the target content server based on a pre-determined relationship of the sub-set of clients to the client; and
  wherein the routing instructions transmitted to the intermediate routing system are further executable by the intermediate routing system to direct content requests transmitted by the sub-set of clients to the target content server via the intermediate routing system.

13. The method of claim 8, wherein selecting the target content server from one of the first content server and the second content server is further based on a workload of each of the first content server and the second content server; and
  wherein selecting the target content server from one of the first content server and the second content server is further based on an amount of content requested by the subsequent content requests transmitted by the client.

14. A web server, comprising:
  a logic subsystem; and
  a memory holding instructions that are executable by the logic subsystem to transmit instructions to a client, the instructions executable by the client to:
    transmit a first content request to a first content server via an intermediate routing system;
    transmit a second content request to a second content server via the intermediate routing system;
    measure a first network performance characteristic indicating a first period of time from transmission of the first content request to reception at the client of content transmitted by the first content server responsive to the first content request;
    measure a second network performance characteristic indicating a second period of time from transmission of the second content request to reception at the client of content transmitted by the second content server responsive to the second content request; and
    issue a report to an administrative server including the first network performance characteristic and the second network performance characteristic; and
  the memory also holding instructions that are executable by the logic subsystem to:
    compare the first network performance characteristic to the second network performance characteristic, wherein comparing the first network performance characteristic to the second network performance characteristic includes identifying a shorter period of time from one of the first period of time and the second period of time;
    select a target content server from one of the first content server and the second content server based on comparison of the first network performance characteristic to the second network performance characteristic, wherein selecting the target content server includes selecting the target content server from one of the first content server and the second content server associated with the shorter period of time; and
    transmit routing instructions to the intermediate routing system, the routing instructions being executable by the intermediate routing system to direct subsequent content requests transmitted by the client to the target content server.

\* \* \* \* \*